United States Patent [19]
Lee et al.

[11] Patent Number: 5,247,907
[45] Date of Patent: Sep. 28, 1993

[54] PROCESS FURNACE WITH A SPLIT FLUE CONVECTION SECTION

[75] Inventors: Jing M. Lee, Stafford; Larry G. Hackemesser, Houston; William J. Bracken, Spring Valley, all of Tex.

[73] Assignee: The M. W. Kellogg Company, Houston, Tex.

[21] Appl. No.: 878,646

[22] Filed: May 5, 1992

[51] Int. Cl.⁵ .......................................... F22B 33/00
[52] U.S. Cl. ................................. 122/1 R; 122/7 R; 122/470
[58] Field of Search ............... 122/467, 468, 135.2, 122/20 A, 20 B, 7 R, 470, 1 R, 1 A

[56] References Cited

U.S. PATENT DOCUMENTS

| | | | |
|---|---|---|---|
| 2,721,735 | 10/1955 | Permann | 263/41 |
| 3,094,391 | 6/1963 | Mader | 23/212 |
| 3,097,631 | 7/1963 | Martin | 122/235 |
| 3,424,695 | 1/1969 | Von Wiesenthal | 252/373 |
| 3,426,733 | 2/1969 | Von Wiesenthal | 122/1 |
| 3,575,002 | 4/1971 | Vuia | 122/1 R X |
| 4,576,121 | 3/1986 | Thorogood | 122/7 R |
| 4,665,865 | 5/1987 | Zubrod | 122/235 |
| 4,706,612 | 11/1987 | Moreno et al. | 122/7 |
| 4,784,069 | 11/1988 | Stark | 110/211 |
| 4,999,089 | 3/1991 | Nakase et al. | 196/110 |

*Primary Examiner*—Edward G. Favors
*Attorney, Agent, or Firm*—John P. Ward

[57] ABSTRACT

A process furnace and method of operating a furnace are disclosed. The furnace comprises a radiant heating chamber, a primary convection section leg, a secondary convection section leg with two or more parallel flow channels, convection burners to heat the primary and/or secondary convection sections and dampers to adjust flue gas flow and temperature through the parallel flow channels. Combustion air comprising a mixture of gas turbine exhaust and fresh air which has been preheated in one of the parallel flow channels s supplied to the burners. The split flue design facilitates greater control of the flue gas temperature for improved operating efficiency.

11 Claims, 1 Drawing Sheet

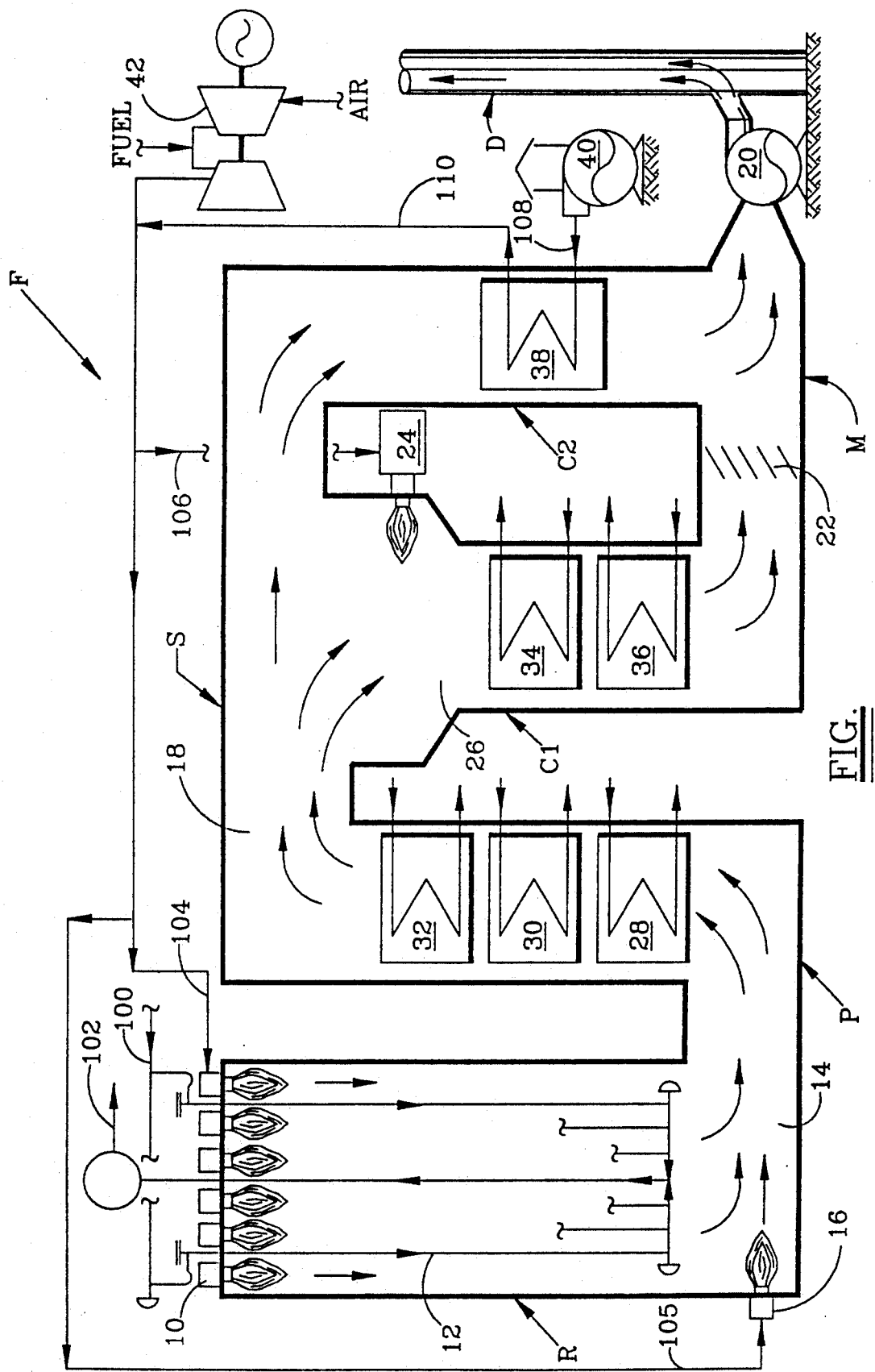

PROCESS FURNACE WITH A SPLIT FLUE CONVECTION SECTION

FIELD OF THE INVENTION

This invention relates to a process furnace, and more particularly to a reforming furnace having a convection section with an efficient design.

BACKGROUND OF THE INVENTION

Several important chemical processes use a high temperature furnace to drive catalytic reactions. Examples include steam reforming of light hydrocarbons for the manufacture of synthesis gas for ammonia, methanol and hydrogen plants, and steam pyrolysis of saturated hydrocarbons to produce olefins. Such furnaces generally include a refractory-lined radiant heating combustion chamber with an arrangement of burners and process stream heat transfer tubes. Combustion product gases are directed from the combustion chamber through a flue gas convection section where the bulk of the waste heat remaining in such gases is extracted by forced convection against other process and utility streams prior to discharge.

Fundamental elements of furnace design are well known and have changed very little. Efforts to improve furnace efficiency have concentrated on the heat transfer equipment, burner design and arrangement and the combustion process itself. For example, combustion improvements have included adjusting reactant ratios, catalyst and furnace firing of the radiant section.

U.S. Pat. Nos. 4,999,089 to Nakase et al.; 4,706,612 to Moreno et al.; and 4,784,069 to Stark describe typical furnace arrangements of radiant and convection heating sections known in the art. Moreno utilizes gas turbine exhaust to preheat and supplement furnace combustion air. Stark also uses turbine exhaust as a low oxygen source of combustion air for operating a furnace in a fuel-rich method.

The use of gas turbine exhaust as part or all of the combustion air in a furnace results directly in reducing overall fuel requirements. However, the combustion product gases from a furnace operated in this manner are greater in volume, but lower in temperature than flue gas from a conventionally operated furnace. The large volume, low temperature flue gas complicates waste heat recovery because the temperature approaches between the flue gas and the process and/or utility stream being heated are too close to allow efficient or economical heat recovery, if at all.

U.S. Pat. No. 4,665,865 to Zubrod describes a steam generator in which a first flue has an upper end with a cross flue leading to a second flue. The cross flue is formed by an intermediate ceiling in the first flue and two vertical walls made of pipe.

U.S. Pat. No. 3,097,631 to Martin describes a means for controlling the flow of heating gas through the flue of a steam boiler or water heater. Combustion product gases conducted along a switchback main duct path can enter a damper controlled bypass duct having a series of dampers allowing part of the gases to selectively bypass part of the main duct path.

U.S. Pat. No. 2,721,735 to Permann describes a furnace wherein the heating tubes are arranged within a heating zone so as to cause combustion gases to flow longitudinally to the tubes and part of the gases are recirculated to the burners.

Other U.S. Pat. Nos. of interest are 3,426,733 and 3,424,695 to Wiesenthal; and 3,094,391 to Mader.

SUMMARY OF THE INVENTION

The present invention resides, in part, in a furnace design using a split flue gas convection section having parallel flow paths. By splitting flue gas into parallel flow channels, greater control can be exercised over the flue gas temperature for enhancing forced convection heat transfer temperature differentials. For example, the flue gas in one of the channels can be selectively heated with a supplemental burner. This furnace design is particularly advantageous when gas turbine exhaust is used for all or part of combustion air in the furnace since more efficient flue gas heat recovery is achieved.

In one aspect, the present invention provides a process furnace. The furnace has a radiant heating chamber heated by a plurality of burners and housing a plurality of heat transfer tubes. A primary convection section leg housing one or more convection coils is in fluid communication with the radiant chamber to receive flue gas therefrom. A secondary convection section leg split into two or more parallel flow channels, each housing one or more supplemental convection coils, is in fluid communication with the primary convection section leg to receive flue gas therefrom. A discharge manifold duct is in fluid communication with the secondary convection section leg to gather and receive flue gas from the parallel flow channels. One or more dampers are disposed in or between the parallel flow channels to regulate the proportion of the flue gas received through each channel.

A line can connect a gas turbine exhaust to the burners to supply exhaust as all or part of the combustion air. The fresh air can be preheated by a heat exchanger disposed in one of the parallel flow channels. The furnace can include one or more tunnel burners for heating flue gas received from the radiant chamber in the primary convection section leg, one or more convection burners for heating flue gas received from the primary convection section leg in one or more of the parallel flow channels, and an induced draft fan disposed in the discharge manifold for withdrawing flue gas from the secondary convection section leg.

In another aspect, the present invention provides a method for operating a process furnace. The method comprises the steps of: heating a radiant heating chamber housing a plurality of heat transfer tubes with a plurality of radiant section burners; passing flue gas from the radiant heating chamber through a primary convection section leg and recovering heat from the flue gas with one or more primary convection coils disposed in the primary convection section leg; dividing the flue gas from the primary convection section leg for passage through two or more parallel flow channels in a secondary convection section leg; recovering heat from the flue gas in each of the flow channels with supplemental convection coils disposed therein; and gathering flue gas from the parallel flow channels in a discharge manifold.

The heating step can use hot gas turbine exhaust as all or part of combustion air for the radiant section burners. The method can include the steps of heating the flue gas from the radiant heating chamber with one or more tunnel burners and heating the flue gas from the primary convection section leg with one or more convection burners in one or more of the parallel flow channels. The radiant heating chamber preferably has an exit temperature of from about 850° C. to about 1100° C. The primary convection section leg preferably has an operating range from about 350° C. to about 1100° C. The secondary convection section leg preferable has an operating range from about 120° C. to about 900° C., more preferably from about 150° C. to about 750° C. The dividing step can include adjusting a damper disposed in or between the parallel flow channels to regulate the proportion of the flue gas received through each channel.

BRIEF DESCRIPTION OF THE DRAWING

The FIGURE is a flow diagram of an embodiment of the furnace of the present invention having a parallel flow split flue secondary convection section leg.

DETAILED DESCRIPTION OF THE INVENTION

A furnace comprising a split flue, parallel flow secondary convection section leg allows flue gas temperature differentials and flowrates to be adjusted for greater efficiency and design flexibility. In addition, the furnace overcomes the waste heat recovery problem posed by lower temperature flue gas when turbine exhaust is used for combustion air.

Referring to the FIGURE, process furnace F has a radiant chamber R, a primary convection section leg P, and a secondary convection section leg S. The radiant chamber R houses a plurality of burners 10 which can be conventional arch burners suspended from an interior ceiling, for example. A plurality of process heat transfer tubes 12 have an inlet supply line 100 and an outlet supply line 102. The burners 10 are supplied by a fuel feed line (not shown) and a combustion air feed line 104. The burners 10 and tubes 12 preferably alternate in spaced relation in a fashion well known to the art so that a flame produced by the burners 10 does not directly impinge the process tubes 12 or associated fittings. The tubes 12 are heated primarily by radiation from the flame and the hot flue gases. The radiant chamber R preferably has a flue gas exit temperature range of from about 850° C. to about 1100° C., more preferably from about 950° C. to about 1100° C.

The radiant chamber R is in fluid communication with the primary convection section leg P through a connecting duct 14. Within the duct 14, combustion product gases (also referred to as flue gas) produced by the burners 10 travel to the primary convection section leg P. The duct 14 can house one or more tunnel burners 16 supplied with combustion air via line 105 to control the flue gas temperature in accordance with process requirements.

The primary convection section leg P of the furnace F is in fluid communication with the secondary convection section leg S through an intermediate connecting duct 18. The secondary convection section leg S has two (or more) channels C1, C2 for dividing the flow of combustion gases from the primary convection section leg P into a parallel flow orientation through the secondary convection section leg S. Additional parallel flow channels (not shown) can be used as desired. Flue gas from the channels C1, C2 is then preferably recombined in a discharge manifold duct M before discharge from the furnace F. The discharge manifold duct M preferably includes an optional fan 20 to induce a draft through the convection section legs P and S from the furnace F into a discharge stack or flue D.

Flow of the flue gas is regulated between the channels C1, C2 using a damper 22. The damper 22 is preferably disposed in the discharge manifold duct M, but can alternatively be placed in the intermediate duct 18. As another alternative, a damper can be placed in each of the flow channels C1, C2 for independent control, but the single damper 22 is preferred for simplicity. In addition, the channels C1, C2 may include one or more supplemental convection burners 24 to provide supplemental heating of the flue gas. The supplemental convection burner 24 is preferably installed at an inlet 26 of the channel C1. The burner 24 is fed by a fuel line (not shown) and combustion air is supplied from feed line 106. The quantity and location of supplemental convection burners 24 in one or more of the parallel flow channels C1, C2 are design parameters subject to any need to increase the temperature approach to the convection coils.

Heat is recovered from flue gas in the primary convection section leg P by forced convection heat transfer using a plurality of primary convection section coils 28, 30, 32 housed in the primary convection section leg P. Similarly, high temperature secondary convection coils 34, 36 are disposed in channel C1, and low temperature secondary convection coils 38 in channel C2. Various process and/or utility streams are heated for various purposes, including, for example, conducting endothermic reactions, generating utilities such as steam, preheating boiler feed water, preheating air and fuel streams for the furnace, and the like. Heat exchanger placement in the primary convection section leg P is dependent on enthalpy requirements and a required process outlet temperature. Process streams having higher outlet temperature are generally placed in a hotter section of the convection section.

The primary convection section leg P generally has a temperature in the range of from about 350° C. to about 1100° C. The flue gas entering the primary convection section leg P is generally at (or above) the exit temperature from the radiant chamber R, and is cooled as it passes around the primary coils 28, 30, 32 and heats the fluids circulated through the coils 28, 30, 32. In a preferred control scheme, the flue gas is heated in the duct 14 by regulating the fuel and combustion air supplied to the tunnel burner 16 at a rate sufficient so that the fluid being heated in coil 28 (or coils 30 and/or 32) reaches the desired temperature.

The secondary convection section leg S is preferably operated at a temperature in the range of from about 120° C. to about 900° C., more preferably from about 150° C. to about 750° C. The flue gas entering the channel C1 is heated as desired by the supplemental convection burner 24. In a preferred control scheme, the burner 24 is operated to supply sufficient heat so that the fluid being heated in the coil 34 (and/or the coil 36) reaches a temperature established as a set point. The flue gas passing through the channel C2 generally enters at the exit temperature from the primary convection section leg P and is cooled as it flows around and heats fluid passing through the coil 38, e.g. supplemental combustion air for the burners 10, 16 and 24, as in the illustrated embodiment. Thus, the channel C2 is generally operated at a lower temperature than the channel C1 to heat fluids which are not required to be heated to a higher temperature.

The secondary convection section leg S can be further optimized by regulating the proportion of flue gas split between the channels C1 and C2 by means of the damper 22 which can be partially closed to force a higher flue gas flow rate through the channel C2, or opened to allow more flue gas through the channel C1. The driving force for forced convection of the first coils 34 and 38 disposed in each parallel flow channel C1 or C2 is enhanced relative to coils disposed in series in a single channel. Design flexibility of the furnace F is also broadened. The split channel design allows greater control over the operating temperature and enthalpy content of the gases in the flue channels C1, C2. The optional supplemental heating by burner 24 can be accomplished more readily than in prior art furnaces because the flue gas flowrate in the channel C1 can also be adjusted in addition to the amount of supplemental heating or duty of the burner 24.

In a preferred embodiment, exhaust from gas turbines generally obtained from rotary equipment drivers, although having a reduced oxygen content, can be used for all or a portion of the combustion air for the various burners. In this manner, the sensible heat of turbine exhaust can be used to enhance burner efficiency and reduce fuel consumption. Turbine exhaust can have an oxygen content from about 13 to about 19 percent by volume, but an oxygen content of from about 14 to about 16 percent by volume is more usual. The turbine exhaust can be combined with fresh air, preferably preheated, to supplement the overall oxygen content. For example, coil 38 disposed in the parallel flow channel C2 heats supplemental fresh air fed through line 108 by a forced draft fan 40. Preheated fresh air in line 110 is then combined with turbine exhaust from turbine 42 in line 104 to supply combustion air to the burners 10, 16 and 24 via lines 104, 105 and 106, respectively.

The ratio of turbine exhaust to fresh air depends on the oxygen requirement for the burners 10, 16 and 24. Oxygen content, in turn, depends on the desired duty of the radiant chamber R and primary convection section leg P. The temperature of the flue gas without additional heating using burner 24 is, of course, lower when the combustion air oxygen content is maintained at minimum requirements.

The furnace F is made from standard furnace construction materials well known in the art. Since temperatures as high as 1100° C. or greater are typically encountered, structural steel is generally used for the support structure and ducts, and refractory insulation is used to line the combustion chambers.

The furnace F of the present invention is useful in a variety of chemical endothermic reaction processes including steam reforming, hydrocarbon cracking, and the like; for the production of utilities such as steam, boiler feed water, and the like; and for preheating various process streams.

The foregoing description of the invention is illustrative and explanatory thereof. Various changes in the materials, apparatus, and particular parts employed will occur to those skilled in the art. It is intended that all such variations within the scope and spirit of the appended claims be embraced thereby.

What is claimed is:

1. A process furnace comprising:
   (a) a radiant heating chamber heated by a plurality of radiant section burners and housing a plurality of heat transfer tubes;
   (b) a primary convection section leg housing one or more convection coils and in fluid communication with the radiant chamber to receive flue gas therefrom;
   (c) a secondary convection section leg split into two or more parallel flow channels, each housing one or more supplemental convection coils and in fluid communication with the primary convection section leg to receive flue gas therefrom;
   (d) a discharge manifold duct in fluid communication with the secondary convection section leg to gather and receive flue gas from the parallel flow channels;
   (e) one or more dampers disposed in or between the parallel flow channels to regulate the proportion of the flue gas received through each channel; and
   (f) a line connecting a gas turbine to the radiant section burners for supplying hot gas turbine exhaust as all or part of combustion air to the radiant section burners.

2. The furnace of claim 1, wherein one of the supplemental convection coils comprises a preheater for fresh combustion air.

3. The furnace of claim 1, further comprising one or more tunnel burners for heating flue gas received from the radiant chamber in the primary convection section leg.

4. The furnace of claim 1, further comprising one or more convection burners for heating flue gas received from the primary convection section leg in one or more of the parallel flow channels.

5. The furnace of claim 1, further comprising an induced draft fan disposed in said discharge manifold for withdrawing flue gas from said secondary convection section leg.

6. A process furnace, comprising:
   a radiant heating chamber heated by a plurality of radiant section burners and housing a plurality of heat transfer tubes;
   a primary convection section leg in fluid communication with the radiant chamber to receive flue gas therefrom, wherein the primary convection section leg houses one or more convection coils and one or more tunnel burners for heating flue gas received from the radiant chamber;
   a secondary convection section leg split into first and second parallel flow channels in fluid communication with the primary convection section leg to receive flue gas therefrom, each channel housing one or more supplemental convection coils and said first channel housing a convection burner for heating flue gas received from the primary convection section leg;
   a discharge manifold duct in fluid communication with the secondary convection section leg to gather and receive flue gas from the parallel flow channels, wherein the duct houses an induced draft fan for withdrawing flue gas from the secondary convection section leg;
   one or more dampers disposed in or between the parallel flow channels to regulate the proportion of the flue gas received through each channel;
   a line connecting a gas turbine exhaust to the radiant section burners for supplying a mixture of the turbine exhaust and fresh air as combustion air; and
   a preheater for the fresh combustion air disposed in one of the parallel flow channels.

7. A method for operating a process furnace comprising the steps of:
   (a) heating a radiant heating chamber housing a plurality of heat transfer tubes with a radiant section burner;

(b) passing flue gas from the radiant heating chamber through a primary convection section leg and recovering heat from the flue gas with one or more primary convection coils disposed in the primary convection section leg;

(c) dividing the flue gas from the primary convection section leg and passing the flue gas through two or more parallel flow channels;

(d) recovering heat form the flue gas in each of the parallel flow channels with supplemental convection coils disposed therein;

(e) gathering flue gas from the parallel flow channels in a discharge manifold; and (f) supplying hot gas turbine exhaust as all or part of the combustion air for the radiant section burner heating the radiant heating chamber in step (a).

8. The method of claim 7, further comprising the steps of preheating fresh air in one of the parallel flow channels and mixing the preheated fresh air with said gas turbine exhaust.

9. The method of claim 7, further comprising the step of heating the flue gas passing through the primary convection section leg from the radiant heating chamber with one or more tunnel burners.

10. The method of claim 7, further comprising the step of heating the flue gas with one or more convection burners in one or more of the parallel flow channels.

11. The method of claim 7, wherein the dividing step comprises adjusting a damper disposed in or between the parallel flow channels to regulate the proportion of the flue gas received through each channel.

* * * * *